Nov. 20, 1923.
G. A. E. MELLIN
TIRE LOCK
Filed June 22, 1921
1,474,541
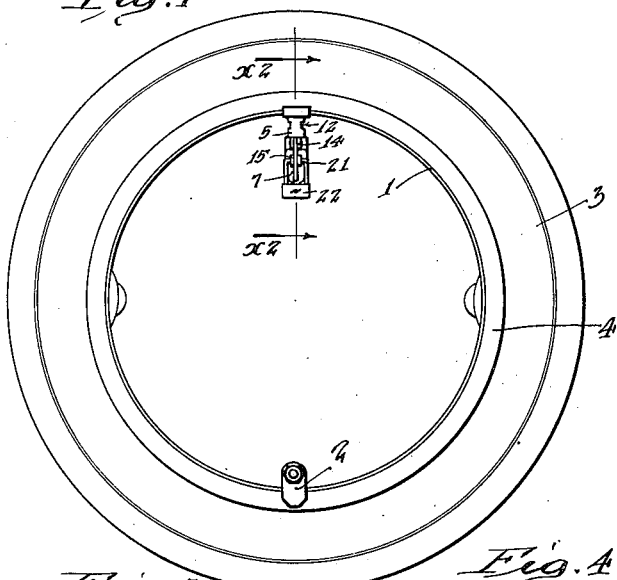
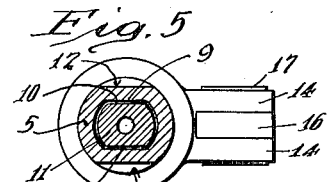
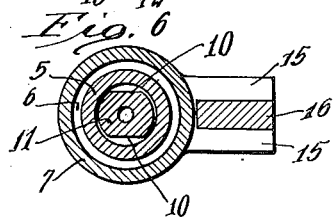
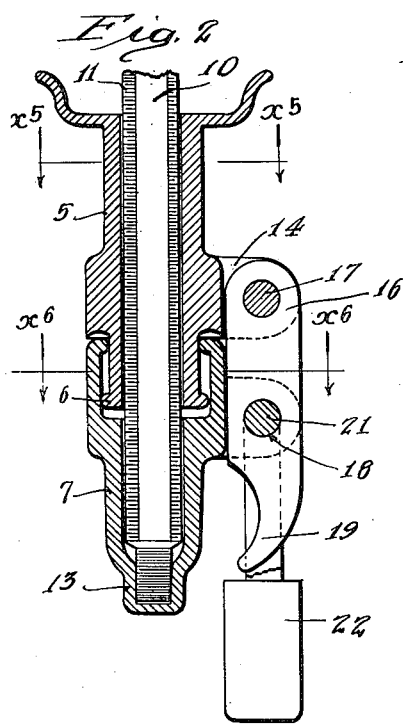
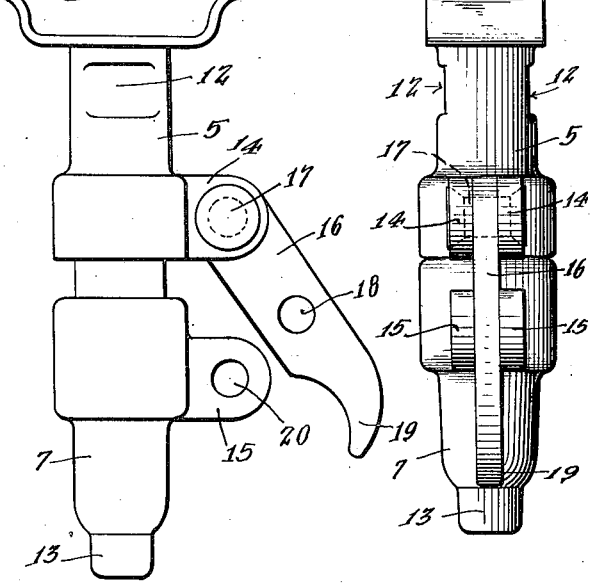
Inventor
Gustaf A. E. Mellin
By Frederick Whyon
Attorney Patented Nov. 20, 1923.

1,474,541

UNITED STATES PATENT OFFICE.

GUSTAF A. E. MELLIN, OF LOS ANGELES, CALIFORNIA, ASSIGNOR TO FREDERICK T. HUGHES, OF LOS ANGELES, CALIFORNIA.

TIRE LOCK.

Application filed June 22, 1921. Serial No. 479,486.

*To all whom it may concern:*

Be it known that I, GUSTAF A. E. MELLIN, a citizen of the United States, residing at Los Angeles, in the county of Los Angeles and State of California, have invented a new and useful Tire Lock, of which the following is a specification.

This invention relates to a tire lock and is particularly directed to a device adapted for cooperation with the tire valve stem.

The object of the invention is to provide a locking device adapted for attachment to a tire valve stem after said stem has been engaged through an aperture in the tire supporting means to prevent the valve stem being removed therefrom by unauthorized persons.

Another object is to provide a device which is also adapted to be applied to the valve stem of a tire mounted upon the wheel of a machine to prevent the theft of the tire from the wheel.

Another object is to provide a device of the above character, which is capable of being quickly and easily manipulated and which cannot be removed by unauthorized persons without destroying the device.

Various other objects and advantages will be more fully apparent from the following description of the accompanying drawings which form a part of this disclosure, and which illustrate a preferred form of embodiment of the invention.

Of the drawings:

Figure 1 is an elevation of a spare tire and the rim positioned on a circular tire rack, with the device of the present invention engaged on the valve stem.

Fig. 2 is an enlarged section on line $x^2$—$x^2$ of Fig. 1.

Fig. 3 is a side elevation of the device in normal condition.

Fig. 4 is a front elevation of the device in the position shown in Fig. 2, and with the padlock removed.

Fig. 5 is a section on line $x^5$—$x^5$ of Fig. 2.

Fig 6 is a section on line $x^6$—$x^6$ of Fig. 2.

The device herein illustrated and described is adapted to cooperate with tire racks which are provided with an aperture through which the valve stem of the spare tire is adapted to extend, the specific type of rack illustrated comprising a circular ring 1 having an aperture at its upper portion to receive the tire valve stem and a clamp member 2 to maintain the lower portion of the tire on the rack. The spare tire 3 is mounted on a wheel rim 4 and inflated and is positioned on the tire rack with its valve stem extended through the aperture in said rack and the device of the present invention then attached to the stem and locked against removal by unauthorized persons.

It will here be mentioned that the type of tire rack disclosed is merely illustrative as it will be evident that various other types of tire rack are adaptable for cooperation with the device of the present invention.

The lock comprises a non-rotative tubular body member 5 having a peripheral bead 6 at its lower end, and a rotatable tubular body member 7 telescopically engaging over the lower end of the member 5 with its upper peripheral edge turned inwardly and providing a connection permitting the member 7 to rotate upon the member 5 and to move longitudinally thereof while at the same time preventing the members from becoming entirely detached from each other. The upper end of the body member 5 is provided with opposed ears and extending forwardly and rearward respectively and adapted to engage the tire rack 1, and the bore of said body member for a portion of its length as diametrically opposite flat portions 9 (see Fig. 5) which fit the flat sides 10 of the standard type of tire valve stem 11 and prevent a rotation of the body member 5 on the valve stem. Said flat portions of the bore are preferably formed by compressing the body member as indicated at 12.

The lower end of the body member 7 has a portion 13 of reduced diameter with its inner wall threaded to be screwed upon the reduced terminal end of the valve stem (see Fig. 2).

Extending from the side wall of the body member 5 is a pair of relatively spaced ears 14 and extending from the side wall of the body member 7 is a similar pair of relatively spaced ears 15. A lock lever 16 is positioned between the ears 14 and is pivoted on a pivot pin 17 which is permanently riveted in place. Said lever has a transverse orifice 18 and its free end is contoured to provide a handle portion 19 to facilitate a convenient operation of the lever. The ears 15 of the body member 7 are provided with relatively aligned transverse orifices 20 and when the device is engaged on a tire valve stem as in Figs. 1 and 2, the lock lever 16 is depressed between the ears 15 with the orifice 18 aligned with the orifices 20 and the bolt 21 of a padlock 22 inserted through the aligned orifices.

In applying the device the body is slid upwardly on to the tire valve stem, the body member 5 being held against rotation by the flat portions 9 of its bore engaging the flat sides 10 of the valve stem. The body member 7 is then rotated causing the threaded reduced portion 13 to be screwed upon the reduced end of the valve stem. The member 7 is rotated until the body member 5 is relatively tight against the tire rack 1 and the ears 15 are vertically aligned with the ears 14 of the member 5.

The lock lever 16 is then depressed, the padlock applied as above explained.

With this device applied to the valve stem of a tire positioned upon the tire rack, said tire cannot be removed until the padlock is unlocked and removed and the lock lever 16 disengaged from the ears 15. The body member 7 can then be unscrewed from the tire valve stem and the device bodily removed, after which the tire may be removed from the tire rack.

From the above it will be seen that the present invention provides a spare tire lock which is quickly and easily manipulated and that it provides a device which will prevent a removal of a spare tire from a tire rack by any person not having a key to fit the padlock.

While in the above description, it has been stated that the device is particularly adapted for cooperation with the tire valve stem of a spare tire positioned upon a tire rack, the device is also adapted to be applied to the valve stem of a tire mounted upon the wheel of a machine, when it is desired to prevent a theft of the tire by its removal from the wheel.

I claim:

1. In a tire lock, the combination with a tire valve stem, of a tubular body adapted to engage over the valve stem, a member rotatable on the body and having a screw-thread engagement with the valve stem, a pivoted lock lever carried by the body, the rotatable member having relatively spaced ears between which the free end of said lever may engage to prevent rotation of the rotatable member, and means for locking the lever to said ears.

2. In a tire lock, the combination with a tire valve stem, of a tubular body adapted to engage over the valve stem, a rotatable member carried by the body and having a screw-threaded portion adapted to engage the valve stem, said member having relatively spaced ears provided with aligned orifices, a lock lever pivoted on the body and adapted to engage between said ears to maintain the rotatable member against movement, the lock lever having a transverse orifice adapted to align with the orifices of the ears, and a lock having a bolt adapted to be inserted through the aligned orifices.

Signed at Los Angeles, California, this 11th day of June, 1921.

GUSTAF A. E. MELLIN.

Witnesses:
CLARENCE B. FOSTER,
L. BELLE WEAVER.